(12) United States Patent
Poiger et al.

(10) Patent No.: US 9,500,742 B2
(45) Date of Patent: Nov. 22, 2016

(54) MISALIGNMENT PROCESSING FOR A VEHICLE RADAR SENSOR

(75) Inventors: Walter Poiger, Bad Neustadt (DE); Florian Trompeter, Hammelburg (DE); Dirk Klotzbuecher, Wurzburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 73 days.

(21) Appl. No.: 14/410,155

(22) PCT Filed: Jun. 28, 2012

(86) PCT No.: PCT/SE2012/050730
§ 371 (c)(1),
(2), (4) Date: Dec. 22, 2014

(87) PCT Pub. No.: WO2014/003615
PCT Pub. Date: Jan. 3, 2014

(65) Prior Publication Data
US 2015/0323651 A1    Nov. 12, 2015

(51) Int. Cl.
| | |
|---|---|
| *G01S 13/42* | (2006.01) |
| *G01S 7/40* | (2006.01) |
| *G01S 13/93* | (2006.01) |
| *G01S 13/58* | (2006.01) |

(52) U.S. Cl.
CPC .............. *G01S 7/4026* (2013.01); *G01S 13/42* (2013.01); *G01S 13/931* (2013.01); *G01S 13/58* (2013.01); *G01S 2013/9321* (2013.01); *G01S 2013/9375* (2013.01)

(58) Field of Classification Search
CPC ...... G01S 13/42; G01S 13/58; G01S 13/931; G01S 2013/9321; G01S 2013/9375; G01S 7/4026

USPC .......................................................... 342/113
See application file for complete search history.

(56) References Cited

U.S. PATENT DOCUMENTS

| | | | |
|---|---|---|---|
| 5,986,601 A | 11/1999 | Sugimoto | |
| 6,202,027 B1 | 3/2001 | Alland et al. | |
| 7,443,335 B2 | 10/2008 | Kai et al. | |
| 2002/0044082 A1* | 4/2002 | Woodington | ...... B60K 31/0008 342/70 |

FOREIGN PATENT DOCUMENTS

DE    197 51 004 A1    5/1999

OTHER PUBLICATIONS

International Search Report—Mar. 14, 2013.

* cited by examiner

*Primary Examiner* — Timothy A Brainard
(74) *Attorney, Agent, or Firm* — Brinks Gilson & Lione

(57) ABSTRACT

The present invention relates to a vehicle radar system (2) arranged to detect objects outside a vehicle (1). The radar system (2) a radar detector (3) and a processing unit (4). The processing unit (4) is arranged to obtain values for detected target angle ($\theta_{err}$) and detected target Doppler velocity ($v_d$) relative the radar detector (3) for each detected object (10$a'$, 10$b'$, 10$c'$, 10$d'$, 10$e'$) during a certain time interval. If there is a zero crossing (14) for a derivative (13) of a function (12) describing the progression of detected target Doppler velocity ($v_d$) as a function of detected target angle ($\theta_{err}$), the processing unit (4) is arranged to detect the zero crossing (14). This zero crossing (14) is indicative of a radar system misalignment ($\theta_m$). The present invention also relates to a corresponding method.

12 Claims, 5 Drawing Sheets

MISALIGNMENT PROCESSING FOR A VEHICLE RADAR SENSOR

CROSS REFERENCE TO RELATED APPLICATIONS

This application claims priority to PCT International Patent Application No. PCT/SE2012/050730, filed on Jun. 28, 2012.

FIELD OF THE INVENTION

The present invention relates to a vehicle radar system arranged to detect objects outside a vehicle, the radar system includes a radar detector and a processing unit. The processing unit is arranged to obtain values for detected target angle and detected target Doppler velocity relative the radar detector for each detected object during a certain time interval.

BACKGROUND OF THE INVENTION

The present invention also relates to a method for estimating a vehicle radar system misalignment, the vehicle radar system being used for detecting objects outside a vehicle. The method includes the step of detecting target angle and target Doppler velocity for each detected object during a certain time interval.

Today, a radar device may be mounted on a vehicle in order to detect reflections from objects in a traveling direction in order to implement functions of speed control and collision prevention. In such a radar device it is required to obtain an azimuth angle in the form of a target bearing angle, a distance with respect to the object and a relative speed between the vehicle and the object.

For most vehicle radar applications it is important to measure the target bearing angle with very high precision. The angle accuracy of a radar system depends on fundamental parameters like modulation technique, component tolerances, assembly precision or installation conditions. Furthermore, due to various environmental influences such as mechanical stress or bad weather, the angle estimation performance might suffer additionally. Some of those error sources show a random statistical distribution while others lead to a fixed angle offset. This fixed offset is the so called misalignment angle. Monitoring the misalignment angle is often an essential requirement in vehicle applications.

There are several approaches known which use vehicle dynamic information, e.g. vehicle speed, yaw-rate or steering angle, to verify trajectories of ground stationary targets. By comparing the expected path of an obstacle with the actual progression of the radar observations, one should be able to estimate the common bearing bias. The success of these techniques highly depends on the precisions of the vehicle dynamic data.

Addressing the above problems, the document U.S. Pat. No. 7,443,335 discloses angle error estimation for a vehicle radar based on relative speeds and reflections. However, since the required accuracy is not available without additional cost impact, it is desirable to have an alternative algorithm which doesn't need exact vehicle data.

There is thus a need for a device and a method for vehicle radar angle error estimation which does not need exact vehicle data.

INTRODUCTORY DESCRIPTION OF THE INVENTION

The above mentioned object is achieved by means of a vehicle radar system arranged to detect objects outside a vehicle, the radar system includes a radar detector and a processing unit. The processing unit is arranged to obtain values for detected target angle and detected target Doppler velocity relative to the radar detector for each detected object during a certain time interval. If there is a zero crossing for a derivative of a function describing the progression of detected target Doppler velocity as a function of detected target angle, the processing unit is arranged to detect the zero crossing. The zero crossing is indicative of a radar system misalignment.

The object is also achieved by means of a method for estimating vehicle radar system misalignment, the vehicle radar system being used for detecting objects outside a vehicle. The method includes the step of detecting target angle and target Doppler velocity for each detected object during a certain time interval.

The method of the invention further includes the steps: calculating a function describing the progression of detected target Doppler velocity as a function of detected target angle, deriving said calculating said function, if there is a zero crossing for the derived function, finding the zero crossing, and using the zero crossing as an estimation of the vehicle radar system misalignment.

According to an example, the function describing the progression of detected target Doppler velocity as a function of detected target angle is numerically defined such that is has a progression like a parabola.

According to another example, the function describing the progression of detected target Doppler velocity as a function of detected target angle is defined as $$V_d = V_h \cdot \left(1 - \frac{\Theta^2}{2}\right).$$

Other examples are disclosed in this description and drawings.

A number of advantages are obtained by means of the present invention. Mainly, a device and a method for vehicle radar angle error estimation which does not need exact vehicle data are provided.

BRIEF DESCRIPTION OF THE DRAWINGS

The present invention will now be described more in detail with reference to the appended drawings, where.

DETAILED DESCRIPTION

Figure 1:
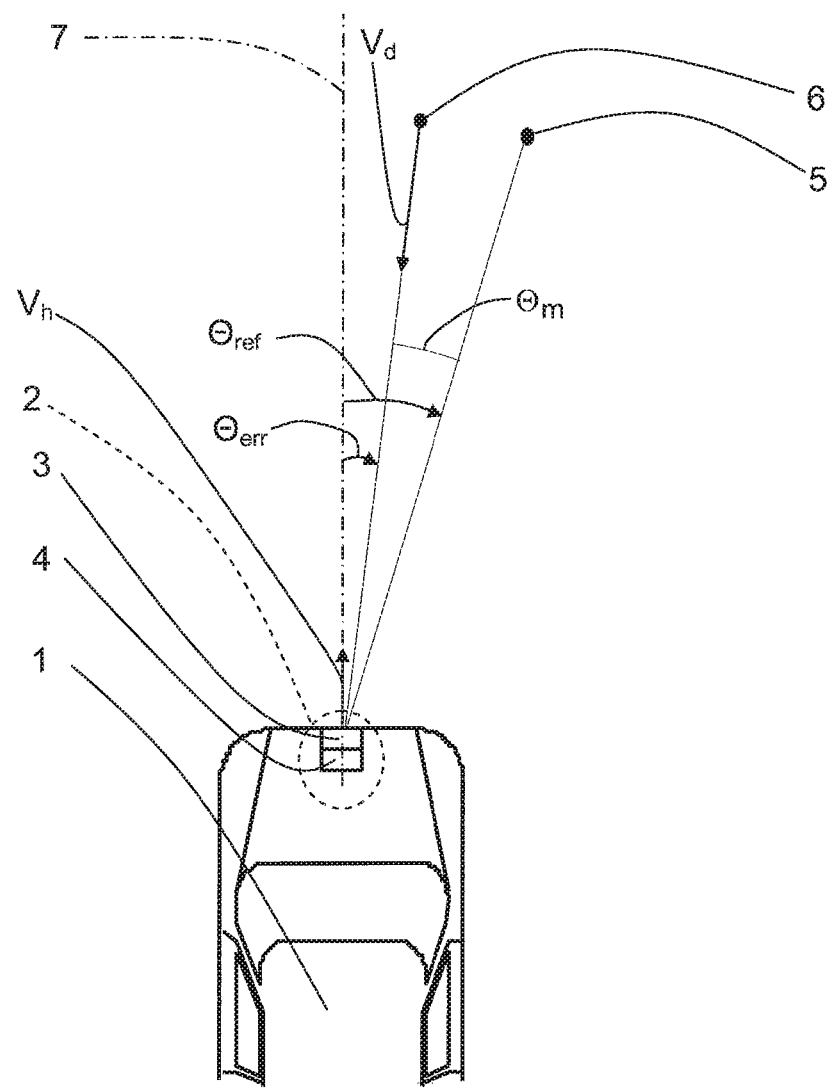
FIG. 1 shows a schematic top view of a vehicle with a radar system.

With reference to FIG. 1, a vehicle 1 includes a radar system 2, which in turn includes a radar detector 3 and a processing unit 4. The vehicle 1 is moving with a certain vehicle velocity $v_h$ and there is an object 5 present in the vehicle's path, where the object is detected by the radar detector 3. However, due to errors such as misalignment error, there is a detected object 6 that differs from the real object 5, such that there is a true target angle $\theta_{ref}$ for the real object 5 and a detected target angle $\theta_{err}$ for the detected object 6, where these angles are measured against a line 7 that extends from the vehicle 1, in its forward running direction, here shown extending along the vehicle's velocity $v_h$. The line may be regarded as extending in boresight of the radar detector 6. The radar detector 3 also detects a target Doppler velocity $v_d$ for the detected object 6.

With reference to the angles above, a misalignment angle $\theta_m$ is defined as.

$$\theta_m = \theta_{ref} - \theta_{err} \qquad (1)$$

Figure 2:
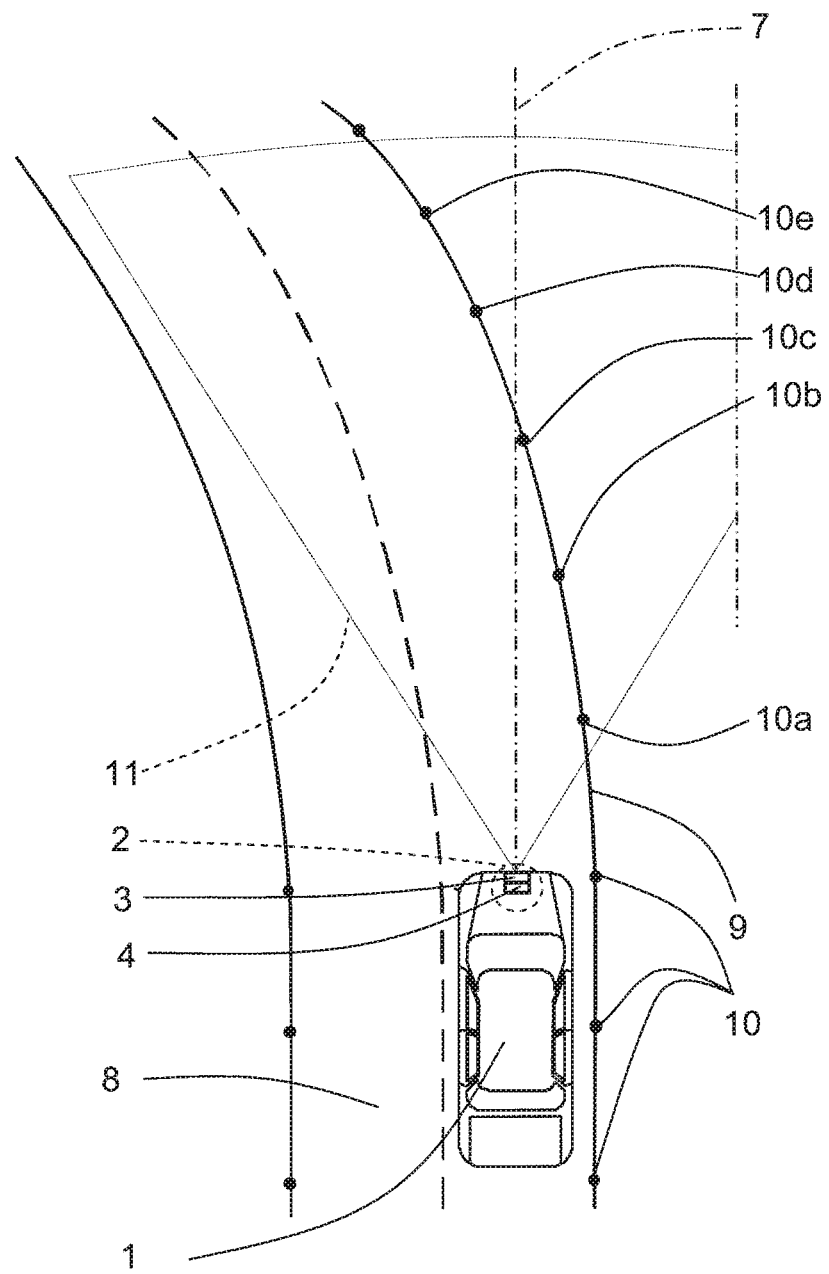
FIG. 2 shows a schematic top view of a vehicle with a radar system travelling on a road.

With the above definitions made, FIG. 2 is now referred to. Here, the vehicle 1 travels on a road 8 with a fence 9, which in turn includes fence posts 10. The radar system 2 has a certain field of view 11, and in the example shown in FIG. 2, showing a certain instant during the vehicle's travel, five fence posts 10 are detected by the radar detector 3, but with a misalignment error. The real five fence posts are constituted by a first real fence post 10a, a second real fence post 10b, a third real fence post 10c, a fourth real fence post 10d, and a fifth real fence post 10e.

The vehicle 1 is moving with a speed $v_h$ greater than zero, in this example it is set to 20 m/s, and the absolute velocity of the real fence posts 10a, 10b, 10c, 10d, 10e is considered as zero. The real fence posts 10a, 10b, 10c, 10d, 10e are furthermore causing a cloud of returns in the radar detector where both detected respective target angles $\theta_{err\_a}$, $\theta_{err\_b}$, $\theta_{err\_c}$, $\theta_{err\_d}$, $e_{err\_e}$ as well as respective target Doppler velocity $v_{d\_a}$, $v_{d\_b}$, $v_{d\_c}$, $v_{d\_d}$, $v_{d\_e}$ are detected within a single scan, these data being available at approximately the same time.

Figure 3:
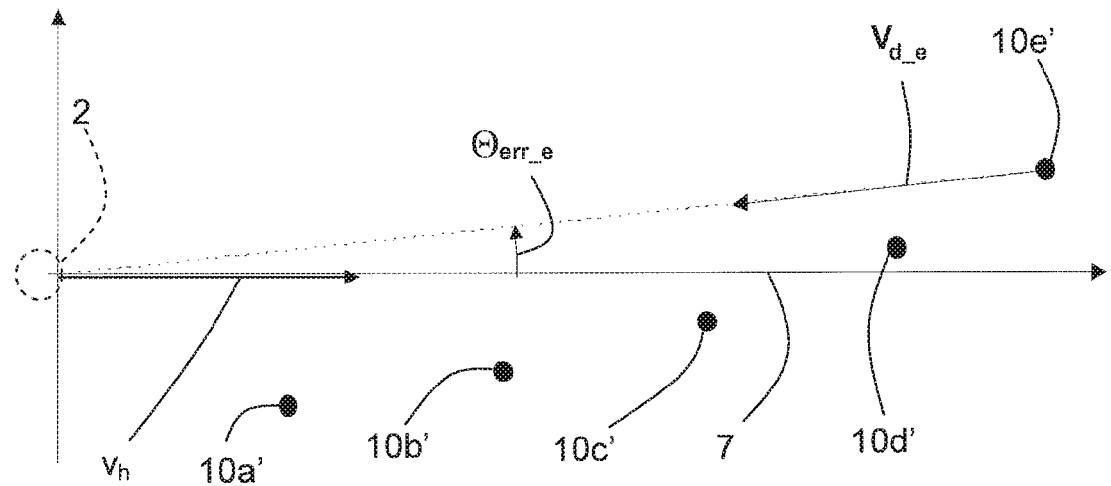
FIG. 3 shows a schematic top view of detected fence posts.

In this example, there is an angle offset ($\theta_m$) of $-2°$ introduced. In FIG. 3, corresponding detected fence posts 10a', 10b', 10c', 10d', 10e' are shown schematically, where the detected target angle $\theta_{err\_e}$ and the detected target Doppler velocity $v_{d\_e}$ of the fifth detected fence post 10e' are shown. Corresponding detected target angles and detected target Doppler velocities are present for all detected fence posts 10a', 10b', 10c', 10d', 10e', but are not indicated in FIG. 3 for reasons of clarity.

Below a table showing a processed target list of this example is presented:

| | Detected fence post | | | | |
|---|---|---|---|---|---|
| | 10a' | 10b' | 10c' | 10d' | 10e' |
| Detected target angle $\Theta_{err}$ [deg] | −27.0 | −11.0 | −3.0 | 2.0 | 6.0 |
| Detected target Doppler velocity $v_d$ [m/s] | −18.13 | −19.75 | −19.997 | −19.95 | −19.81 |

The target list is sorted by angle, all angles being different. It is a fact that the smaller the bearing angle, the higher the absolute detected Doppler velocity of each target, which means that the highest detected target Doppler velocity is expected at boresight of the radar detector 3, i.e. along the line 7. This assumes a constant vehicle velocity $v_h$, and this is the case for targets detected in a single radar scan.

According to the present invention, if there is a zero crossing for a derivative of a function describing the progression of detected target Doppler velocity as a function of detected target angle, the processing unit 4 is arranged to detect said zero crossing. The zero crossing is indicative of the radar system misalignment, which in this example is $-2°$.

In order to obtain this, it is necessary to find an appropriate function describing the progression of detected target Doppler velocity as a function of detected target angle. The parameters of this function have to be processed and its local minimum determined, if there is any. Since only the position of such a local minimum is required as a final result of the present invention, this makes the present invention robust against tolerances of the accuracy for the vehicle velocity $v_h$.

As apparent from FIG. 3, the detected target Doppler velocity $V_d$ as a function of detected target angle $\theta_{err}$ for each detection may be written as:

$$V_d = V_h * \cos(\theta_{err}). \qquad (2)$$

According to the Taylor series of a cosine function, the following may be written:

$$\cos(x) = \frac{x^0}{0!} - \frac{x^2}{2!} + \frac{x^4}{4!} \pm \dots . \qquad (3)$$

According to equation (3), a good approximation for smaller angles is a quadratic function according to:

$$\cos(x) \approx 1 - \frac{x^2}{2}. \qquad (4)$$

Equation (2) and equation (4) combined give:

$$V_d = V_h \cdot \left(1 - \frac{\Theta_{err}^2}{2}\right). \qquad (5)$$

Figure 4:
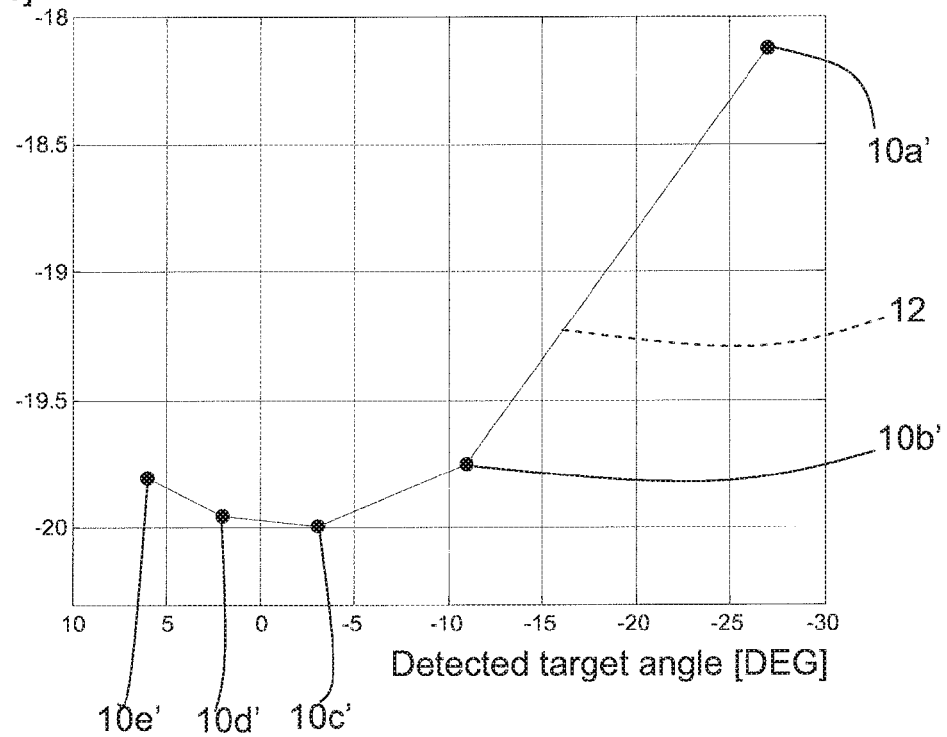
FIG. 4 shows a function describing the progression of detected target Doppler velocity as a function of detected target angle.
Figure 5:
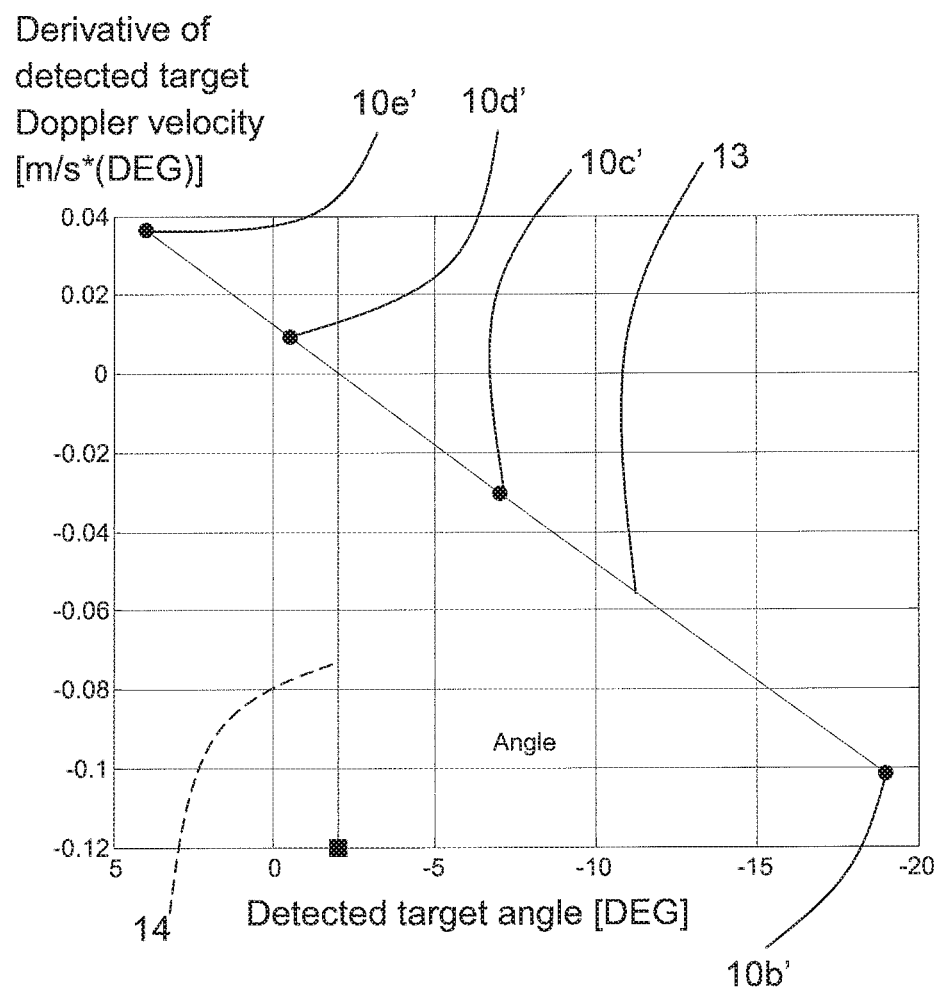
FIG. 5 shows a derivative of the function in FIG. 4.

Equation (5) has a progression like a parabola, which is illustrated in FIG. 4 with a first graph of function 12 for the target list according to this example, as disclosed in the previously shown table. The derivative of the first graph of function 12 is shown as a second graph 13 in FIG. 5, where the derivative results in a straight line. There are a number numerical methods available estimating the parameters of a linear function. An example will be discussed below.

The derivative illustrated by the second graph 13 constitutes the difference in Doppler velocity of two successive data points. All delta values must be normalized with the differences of detected target angles.

$$Y(i = 1 \dots n-1) = \frac{Vd(i+1) - Vd(i)}{\Theta(i+1) - \Theta(i)}, \qquad (6a)$$

where n is the number of data points.

The Y data calculated according to equation (6a) above represents the gradient of the parabola in the center between two data points. Hence, the ordinate X must be modified as well, as shown below:

$$X(i = 1 \dots n-1) = \frac{1}{2} * (\Theta(i) + \Theta(i+1)) \qquad (6b)$$

A linear regression according to:

$$Y = m*X + b \qquad (7)$$

is performed to estimate the parameters m and b of a straight line. The misalignment error $\theta_m$ corresponds to the zero crossing 14 of the second graph 13, and can be calculated as:

$$\Theta m = -\frac{b}{m}$$

As can be derived from the zero crossing 14 in this case, the misalignment error $\theta_m$ equals the previously mentioned −2°.

Figure 6:
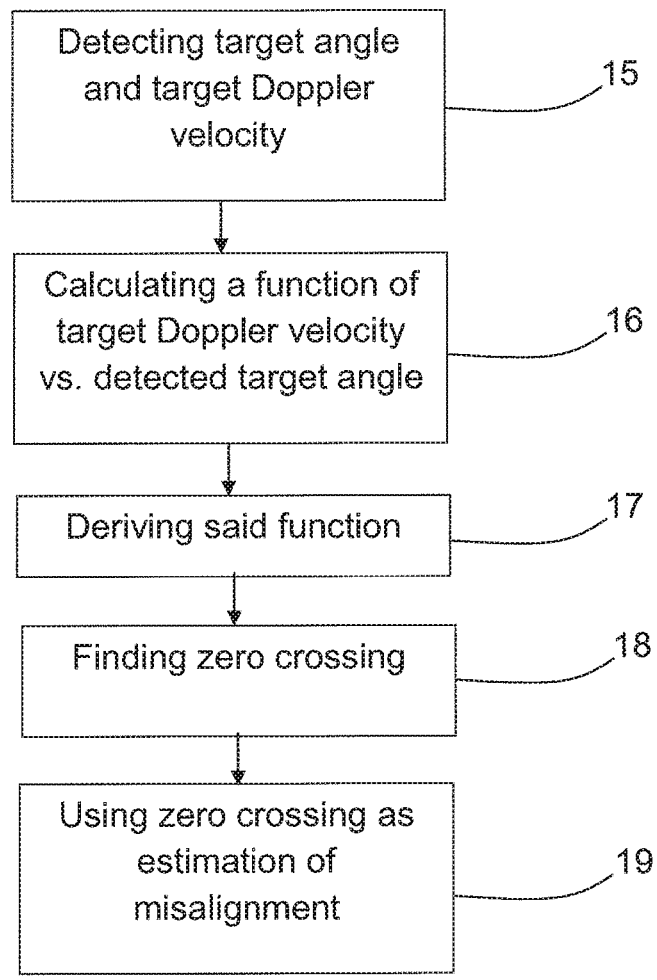
FIG. 6 shows a flowchart for a method according to the present invention.

With reference to FIG. 6, the present invention also relates to a method for estimating a vehicle radar system misalignment $\theta_m$, the vehicle radar system 2 being used for detecting objects outside a vehicle 1. The method comprises the steps:

Step 15: detecting target angle $\theta_{err}$ and target Doppler velocity $v_d$ for each detected object 10a', 10b', 10c', 10d', 10e' during a certain time interval;

Step 16: calculating a function 12 describing the progression of detected target Doppler velocity $v_d$ as a function of detected target angle $\theta_{err}$;

Step 17: deriving said function 12;

Step 18: if there is a zero crossing 14 for the derived function 13, finding the zero crossing 14; and Step 19: using the zero crossing 14 as an estimation of the vehicle radar system misalignment $\theta_m$.

The present invention is not limited to the examples above, but may vary freely within the scope of the described invention. For example, other methods than the described linear regression for calculating the zero crossing for derivative of the function describing the progression of detected target Doppler velocity as a function of detected target angle are conceivable, for example a so-called robust med-fit technique.

The microwave parts of the radar system 2 are assumed to be of a previously known design, and the radar system 2 includes more parts than shown, for example a radar transmitter, while a radar receiver is assumed to be in the form of the radar detector 3. The radar detector 3 may be in the form of a receiving antenna array. The radar system 2 may furthermore include a number of other parts, and is for example connected to a warning and/or information device in the vehicle 1 in a previously known manner.

All details given in the example, such as values of angles and Doppler velocities, are of course only given as an illustration of the present invention, and should not be regarded as limiting in any way.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system arranged to detect objects outside a vehicle, the radar system comprising a radar detector and a processing unit, the processing unit being arranged to obtain values for detected target angle ($\theta_{err}$) and detected target Doppler velocity ($v_d$) relative to the radar detector for each of the objects during a certain time interval, the processing unit configured such that if there is a zero crossing for a function describing the progression of the detected target Doppler velocity ($v_d$) as a function of the detected target angle ($\theta_{err}$), the processing unit is further configured to calculate the zero crossing, the zero crossing being indicative of a radar system misalignment angle ($\theta_m$).

2. A vehicle radar system according to claim 1, further comprising in that the function describing the progression of detected target Doppler velocity as a function of detected target angle is numerically defined such that the function describing the progression has a progression like a parabola.

3. A vehicle radar system according to claim 2, further comprising in that the function describing the progression of detected target Doppler velocity ($v_d$) as a function of detected target angle ($\theta_{err}$) is defined as:

$$v_d = v_h \cdot \left(1 - \frac{\Theta_{err}^2}{2}\right),$$

where $v_h$ represents vehicle velocity.

4. A vehicle radar system according to claim 1, further comprising the zero crossing is determined as a derivative of the function describing the progression.

5. A vehicle radar system according to claim 1, further comprising the radar system misalignment angle ($\theta_m$) represents the difference between the detected target angle ($\theta_{err}$) and a true target angle ($\theta_{ref}$), and the processing unit using the system misalignment angle ($\theta_m$) to correct further detected values of the detected target angle ($\theta_{err}$).

6. A vehicle radar system according to claim 5, further comprising the difference between the detected target angle ($\theta_{err}$) and the true target angle ($\theta_{err}$), is relative to a longitudinal line extending from the vehicle.

7. A method for estimating a vehicle radar system misalignment angle ($\theta_m$), the vehicle radar system being used for detecting objects outside a vehicle, the method comprising the steps of:

detecting a target angle ($\theta_{err}$) and a target Doppler velocity ($v_d$) for each of the objects during a certain time interval;

calculating a function describing the progression of the detected target Doppler velocity ($v_d$) as a function of the detected target angle ($\theta_{err}$);

if there is a zero crossing for the function describing the progression, finding the zero crossing; and using the zero crossing as an estimation of the vehicle radar system misalignment angle ($\theta_m$).

8. A method according to claim 7, further comprising in that the function describing the progression of the detected target Doppler velocity ($v_d$) as a function of the detected target angle ($\theta_{err}$) is numerically defined as a progression like a parabola.

9. A method according to claim 7, further comprising in that the function describing the progression of the detected target Doppler velocity ($v_d$) as a function of detected target angle ($\theta_{err}$) is defined as:

$$v_d = v_h \cdot \left(1 - \frac{\Theta_{err}^2}{2}\right),$$

where $v_h$ represents velocity of the vehicle.

10. A method according to claim 8 further comprising in that the step of finding the zero crossing comprises the step of:

calculating data Y representing a gradient of the parabola in a center between two data points according to:

$$Y(i = 1 \ldots n-1) = \frac{Vd(i+1) - Vd(i)}{\Theta(i+1) - \Theta(i)},$$

where n is the number of data points, and $\theta$ is an angle formed between a line extending from the vehicle and a line to the object detected, modifying the ordinate X according to:

$$X(i = 1 \ldots n-1) = \frac{1}{2} * (\Theta(i) + \Theta(i+1)),$$

performing linear regression to estimate the parameters m and b of a straight line according to:

$Y = m*X + b$, and calculating the misalignment error ($\theta_m$) as:

$$\Theta m = -\frac{b}{m}.$$

11. A method according to claim 7, further comprising the step of deriving the function describing the progression.

12. A method according to claim 7, further comprising the radar system misalignment angle ($\theta_m$) represents the difference between the detected target angle ($\theta_{err}$) and a true target angle ($\theta_{ref}$), and using the system misalignment angle ($\theta_m$) to correct further detected values of the detected target angle ($\theta_{err}$).

* * * * *